Sept. 14, 1943.  M. REAGAN  2,329,295

MUD SCREEN

Filed March 22, 1940    2 Sheets-Sheet 1

Inventor
MARTIN REAGAN.

By E. V. Hardway
Attorney

Patented Sept. 14, 1943

2,329,295

UNITED STATES PATENT OFFICE 2,329,295

MUD SCREEN

Martin Reagan, Houston, Tex.

Application March 22, 1940, Serial No. 325,384

3 Claims. (Cl. 210—149)

This invention relates to a mud screen and has particular relation to a screen specially designed for screening out shale, sand and other heavy solid particles from the drilling fluid, commonly known as drilling mud, which is circulated through the well in carrying on well drilling operations.

As is well known the drilling fluid above referred to should be maintained at the desired density and of the required specific gravity and should, as far as possible, be kept free of heavy particles that will have a tendency to quickly settle in the well when circulation is temporarily suspended.

As the drilling fluid, in the course of circulation, returns from the well on its way back to the pit it is laden with shale, sand and other heavy material which should be separated from it before it is returned to the well. It is a prime object of this invention to provide a vibrating screen over which the fluid passes on its way to the pit and which is equipped with vibratory mechanism arranged to be operated by the fluid itself whereby the screen will be vibrated as the fluid passes thereover and as a result the objectionable heavy material and particles will be screened from the fluid leaving the fluid unencumbered thereby to return to the pit and thence back into the well.

It is a further object of the invention to provide means for vibrating the screen without undue severity so that the parts will not be injured but the motion imparted to the screen will maintain the material collected on the screen under constant forward and downward movement along the screen toward the discharge end thereof so as not to appreciably interfere with the passage of the drilling fluid through the screen.

A further object of the invention is to provide novel means for hanging the screen in the frame.

The invention also embodies means for bypassing the drilling fluid around the screen into the pit in case the screen, for any reason, becomes inoperative.

With the above and other objects in view the invention has particular relation to certain novel features of construction, operation and arrangement of parts, an example of which is given in this specification and illustrated in the accompanying drawings, wherein.

Figure 1:
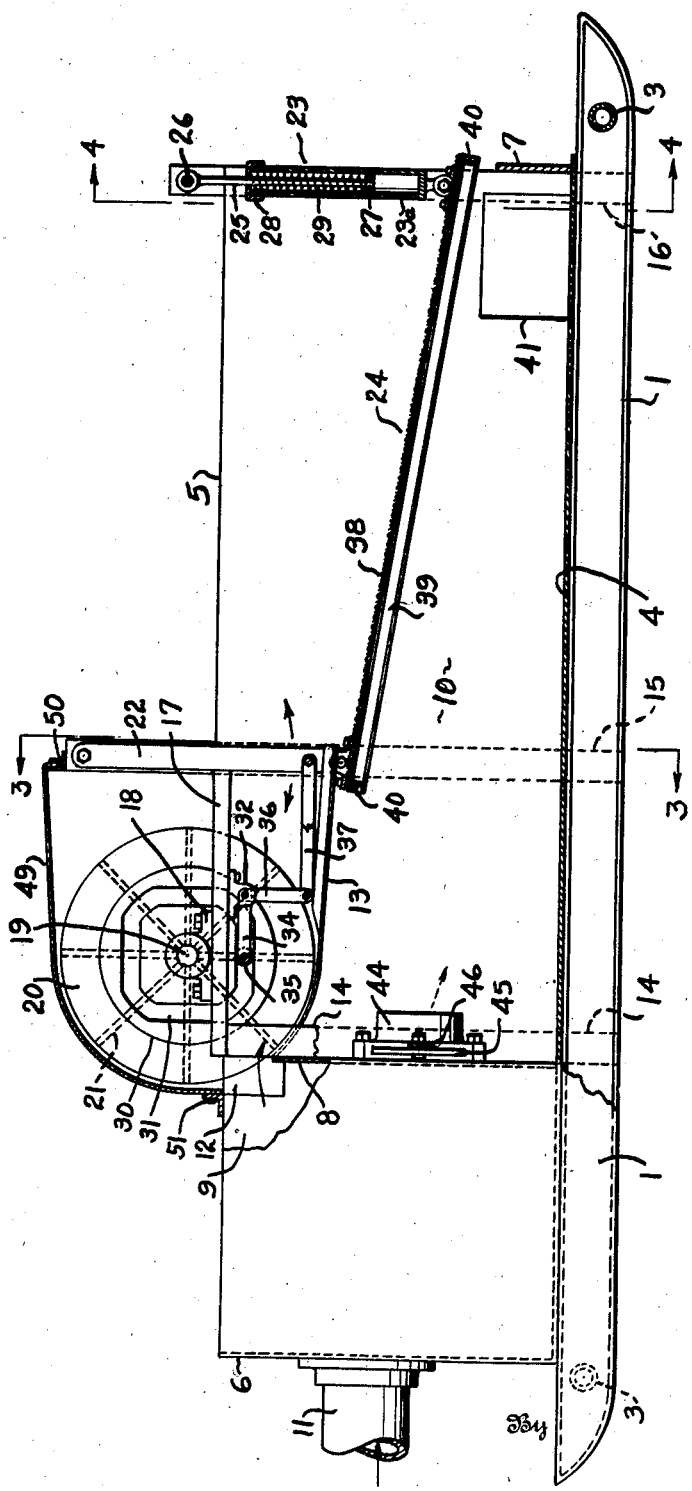
Figure 1 shows a side elevation of the screen, partly in section.

Referring now more particularly to the drawings wherein like numerals of reference designate the same parts in each of the figures, the numerals 1, 1 designate suitable runners, preferably formed of channel irons and connected at their ends in any preferred manner as by means of transverse tubes whose respective ends may be welded to the runners. On the runners there is a box-like casing having a bottom 4 extending approximately from end to end of the structure and also having the side walls 5, 5 and the end walls 6, 7.

The casing has a transverse weir 8 whose upper margin is the required distance beneath the upper margin of the side walls 5. This weir, therefore, forms a receiving chamber 9 and a delivery chamber 10.

Figure 2:
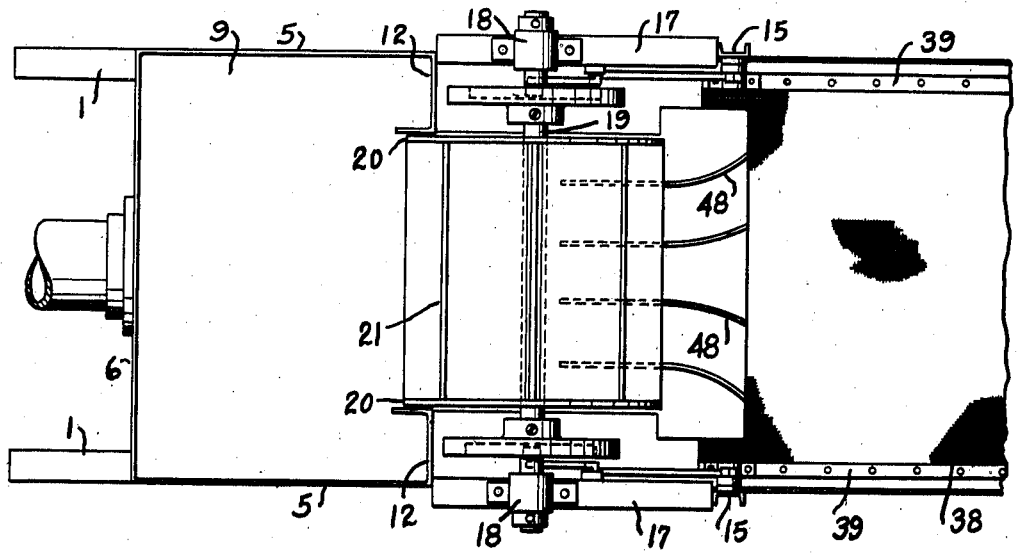
Figure 2 shows a fragmentary plan view showing the enclosing hood removed.
Figures 3, 4:
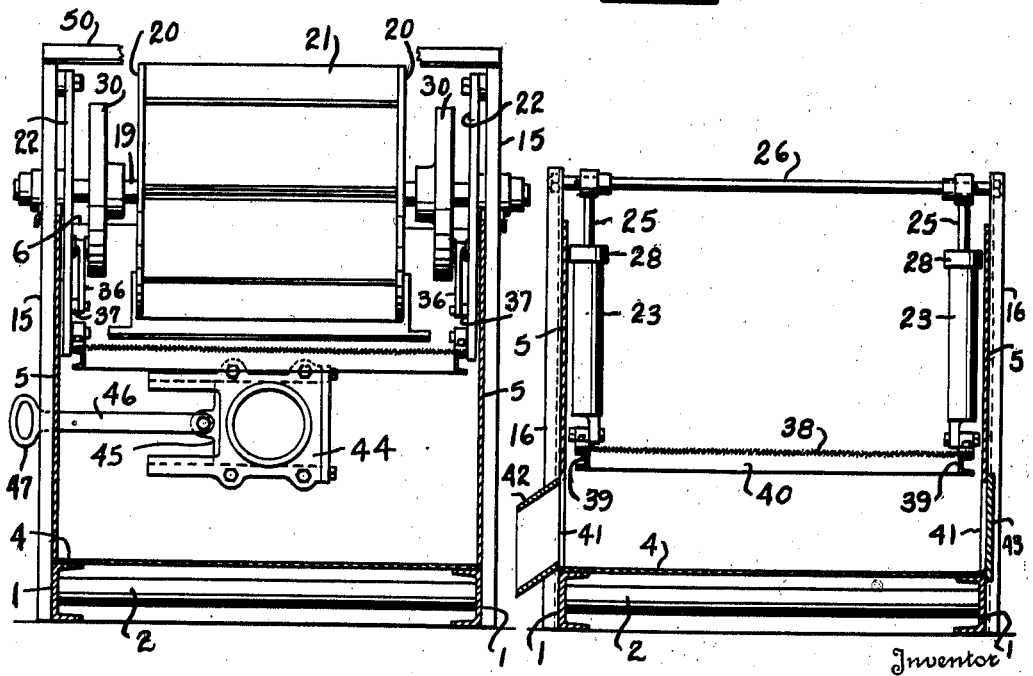
Figure 3 shows a vertical, sectional view taken on the line 3—3 of Figure 1.
Figure 4 shows a vertical, sectional view taken on the line 4—4 of Figure 1.

The drilling fluid returning from the well will flow through the well delivery pipe 11, in the direction indicated by the arrow in Figure 1, into the receiving chamber 9 and will overflow the weir 8, as clearly indicated in Figure 2.

The overflow channel from the chamber 9 is restricted in width by the side extensions 12, 12 of the weir 8 which extend upwardly to the upper margins of the side walls 5, the overflow occurring between said extensions 12, 12 as indicated by the arrow in Figure 1.

Declining forwardly from the top of the weir 8 there is a chute, or flume, 13 of approximately the same width as the overflow channel but whose lower forward end is widened each way as clearly shown in Figure 2.

There are the rear side legs 14, 14, the intermediate side legs 15, 15 and the forward side legs 16, 16. These respective side legs are secured to the runners 1, 1 and extend upwardly adjacent the outer sides of the casing walls.

At the top of the side walls are the longitudinal supporting bars 17, 17 which are secured in any preferred manner to the corresponding legs 14, 15 on each side.

Mounted on these bars are the transversely aligned bearings 18, 18 in which the transverse shaft 19 is rotatably mounted. This shaft supports a paddle wheel formed of the end discs 20, 20 and the radial blades 21, any preferred number of blades being employed to produce the required power. The paddle wheel is of a length equal, approximately, to the width of the flume. The rear end of the flume is curved to conform to the curvature of the paddle wheel as clearly illustrated in Figure 1. Accordingly, as the drilling fluid passes from the receiving chamber 9 along the flume 13 the paddle wheel will be rotated.

Swung from the upper ends of the side legs 15 are the links 22, 22 forming hangers and swung from the upper ends of the legs 16 are the hangers 23, 23. The hangers 22, 23 are of approximately the same length. The lower ends of these hangers are pivotally connected to the upper and lower ends, respectively, of the screen 24. The legs 15 extend up higher than the legs 16. Accordingly, the screen will decline forwardly. Each hanger 23 embodies a cylinder 23a, whose lower end is pivoted to the screen, and a rod 25 whose upper end has a bearing on the rod 26 which connects the upper ends of the legs 16. The lower end of the rod 25 has a stop 27 thereon and the upper end of the cylinder 23a is enclosed by a cap 28 through which the rod 25 works. A coil spring 29 is enclosed within the cylinder and surrounds the rod 25 and is confined between the stop 27 and the cap 28 whereby the lower end of the screen is yieldingly suspended. Fixed on the shaft 19 out beyond the corresponding ends of the paddle wheel are the cam discs 30, 30. The outer face of each disc is provided with a cam shaped groove 31 of any selected contour. Pivoted on bearings 32, 32, depending from the bars 17, are suitable bell cranks, each having an arm 34 provided with a bearing roller 35 which runs in the corresponding cam groove 31 and also having an arm 36 whose lower end is pivoted to one end of the link 37, the other end of said link being pivoted to a hanger 22. Accordingly, as the paddle wheel turns the cam discs 30 will be driven, the bell cranks will be oscillated and the links 37 will be reciprocated back and forth causing an oscillation of the hangers 22 in the direction indicated by the arrows in Figure 1. The screen and hangers 23 will be correspondingly oscillated.

The screen, as is obvious, will be oscillated forwardly and rearwardly. The lower ends of the hangers will describe arcs in their movements and the screen will also have a vertical, vibratory movement due to the construction of the hangers 23 for the reason that the springs 29 will be subjected to varying loads due to the variation in the accumulations of the solid material on the screen and due to the oscillatory movements of the screen.

As the drilling fluid laden with solid material to be removed passes down over the screen the pure fluid will flow down through the foraminated screen covering 38 which is stretched across the rectangular screen frame formed of the longitudinal side members 39, 39 and the transverse end members 40, 40 which connect the ends of said side members.

The drilling fluid to be returned into the well will therefore pass into the chamber 10 but the shale, sand and other solid material to be screened out will pass on downwardly in a substantially constant movement over the screen and will be discharged off of the lower end of the screen outside of the chamber 10, to be removed.

The screen may be located on either side of the receiving pit for the drilling fluid. At the forward end of the chamber 10 there are the side discharge openings as 41, 41. Leading from one of the side openings into the pit there is a declining chute 42. Either side opening may be used and while used the other may be closed by a closure plate 43.

At times the screen may fail to function and it may be necessary to make repairs thereon while the drilling operation is in progress and while circulation must be maintained. Therefore, the weir 8 is provided with an opening which is surrounded by a valve casing 44 which is secured to said weir and which contains a slidable valve 45. Connected to this valve there is an operating link 46 whose outer end has a hand grip 47. Thereby the valve may be opened or closed. When the screen is functioning properly the valve will be kept closed. Should it fail to function, or should repairs become necessary thereon, the valve 45 may be opened to permit the returning drilling fluid from the well to by-pass the screen and to flow into the pit, until the screen is again put into operation and then closed.

As clearly shown in Figure 2 the flume, or chute, 13 has the forwardly diverging distributors 48 spaced apart therealong and extending forwardly to the forward end of the chute for the purpose of securing a substantially uniform distribution of the drilling fluid across the screen.

The paddle wheel may be shielded, above, by means of the hood 49 whose forward edge is secured to a transverse angle iron 50 connecting the upper ends of the legs 15 and whose rear margin is secured to the transverse angle iron 51 supported on the upper edges of the side walls 5.

The drawings and description are illustrative merely, while the broad principle of the invention will be defined by the appended claims.

What I claim is:

1. A screen apparatus for screening drilling fluid or the like, comprising a casing, a transverse weir separating the casing into a receiving compartment and a delivery compartment, on a common level a forwardly declining screen above the delivery compartment, hangers for suspending the upper and lower ends of the screen, the hangers suspending the lower end of the screen being formed of sections with yieldable means between the sections whereby the lower end of the screen is yieldingly suspended, a chute having one end adjacent the weir and which declines forwardly and whose other end extends over the screen and along which fluid overflowing the weir from the receiving compartment may be delivered onto the screen, means including a water wheel mounted on the casing and connected to some of the hangers and arranged to be actuated by the oncoming stream of fluid and effective to oscillate the hangers and screen, a discharge outlet leading from the delivery compartment, said weir having a valve controlled gate through which the oncoming fluid may be by-passed to the discharge outlet.

2. A screen apparatus for screening drilling fluid or the like, comprising a casing, a transverse weir separating the casing into a receiving compartment and a delivery compartment, a forwardly declining screen suspended from the delivery compartment, hangers for suspending the upper and lower ends of the screen, the hangers suspending the lower end of the screen being yieldable whereby said lower end is yieldingly suspended, a chute having forwardly distributors spaced apart and extending from end to end thereof said chute having one end thereof adjacent the weir and its other end widened and extended over the screen and along which the fluid overflowing the weir from the receiving compartment may be delivered onto the screen, a water wheel mounted on the casing and arranged to be rotated by the oncoming stream of fluid flowing through the chute, means operatively connected with and arranged to be oscillated by the water wheel, means connecting said oscillatable means to the hangers suspending the upper end of the screen whereby the hangers and the screen will be oscillated forwardly and rearwardly and the screen will be permitted to move vertically during said oscillatory movements.

3. A screen apparatus for screening drilling fluid comprising a box-like casing having a bottom, end walls and side walls, one of said sidewalls having a discharge opening, a transverse weir separating the casing into a receiving compartment and a delivery compartment on a common level, a forwardly declining screen above the delivery compartment whose lower end extends beyond said compartment, hangers for suspending the upper and lower ends of the screen, a chute having one end adjacent the weir to receive the liquid overflowing the weir, said chute declining forwardly and having its other end extended over the screen; said chute being provided to conduct fluid overflowing the weir from the receiving compartment onto the screen, means including a water wheel mounted on the casing and operatively connected to some of the hangers and arranged to be actuated by the oncoming stream of fluid and effective to oscillate the hangers and screen, and a valve controlled gate through the weir through which the oncoming fluid may be by-passed around the chute into the receiving compartment.

MARTIN REAGAN.